July 22, 1947.    L. L. CUNNINGHAM    2,424,304
CONTROL SYSTEM
Filed June 5, 1943
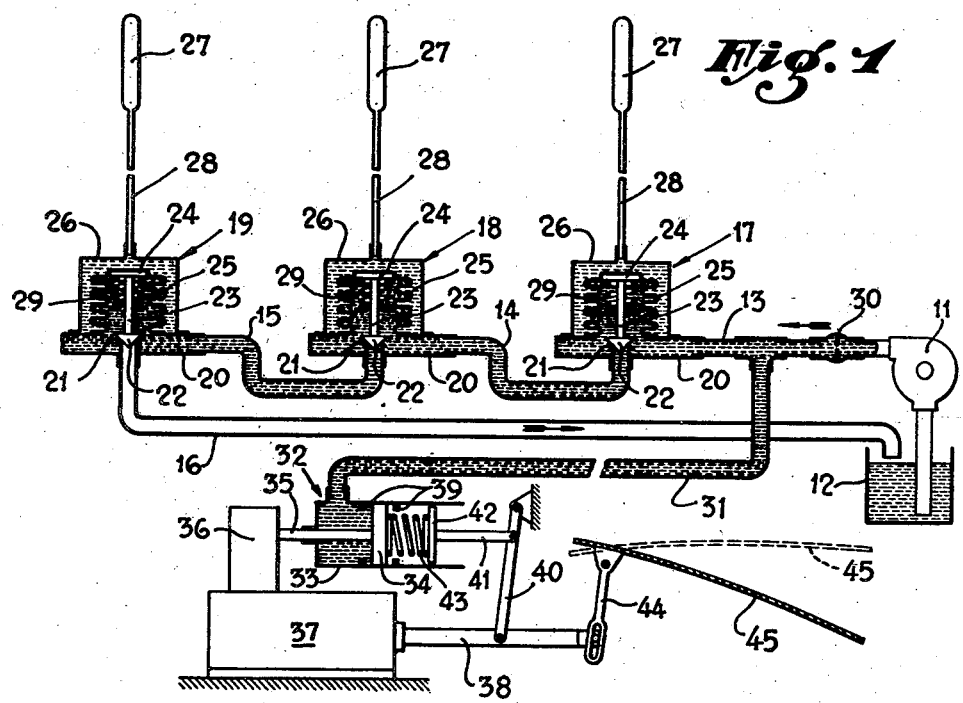
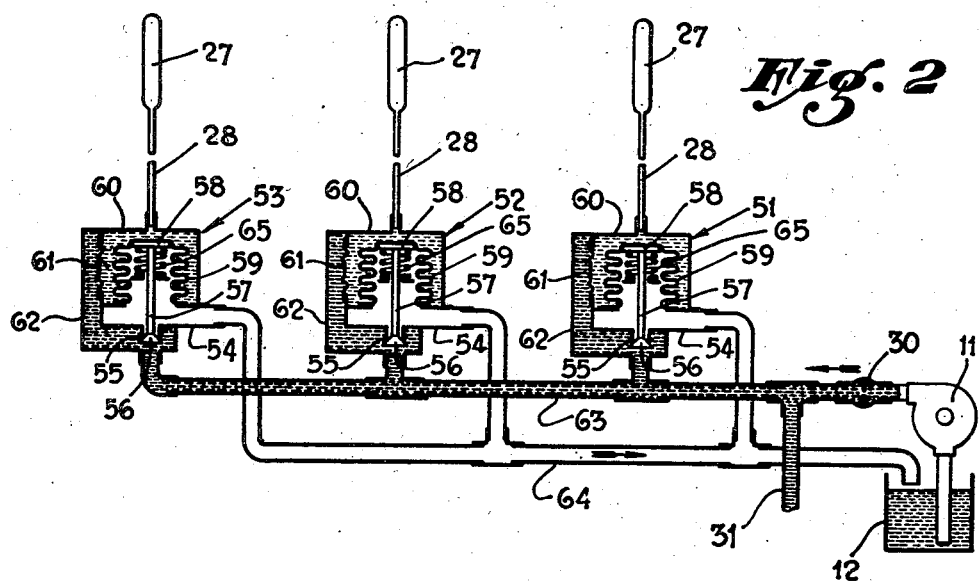
Inventor:
LEWIS L. CUNNINGHAM,
By John H. Rouse,
Attorney.

Patented July 22, 1947

2,424,304

UNITED STATES PATENT OFFICE 2,424,304

CONTROL SYSTEM

Lewis L. Cunningham, Los Angeles, Calif., assignor to General Controls Co., Glendale, Calif., a corporation of California Application June 5, 1943, Serial No. 489,796

1 Claim. (Cl. 236—86)

My present invention relates to control systems, and more particularly to those of the pressure-controlled type.

An object of this invention is to provide a pressure-controlled condition-controlling system, including a plurality of independent condition-responsive means, whereby that one of the means which is subjected to a degree of the condition which is furthest from that desired, has a dominant controlling effect in the system. The invention, while not so limited, has particular utility in connection with cooling systems for aircraft engines, of the air-cooled type, wherein it is desirable to control the flow of air to the engine in accordance with the requirement of the hottest cylinder.

A more specific object is to provide, in a condition-controlling system of the character described, a fluid-pressure motor for operating the condition-changing means, a plurality of valves for controlling the operation of the motor, and individual condition-responsive means for operating the valves—the valves being so arranged that, when the degree of the condition to which any one of the valve-operating means is subjected departs substantially from that desired, the corresponding valve has a dominant controlling effect on the motor.

Other objects and advantages of the invention will be found in the description, the drawing, and the claim; and, for full understanding of the invention, reference may be had to the following detailed description and accompanying drawing, wherein:

Figure 1 is a schematic view of a control system embodying this invention; and

Figure 2 is a similar view of a modified form of the fluid-pressure control system shown in Fig. 1.

Referring first to Fig. 1, the numeral 11 indicates a pump which serves to draw liquid from a reservoir 12 and to force it, in the direction of the arrows, through a conduit, sections of which are indicated at 13, 14, 15 and 16. Connected in series in the conduit between the sections are valves 17, 18 and 19, each of identical construction and comprising a casing 20 having a valve seat 21 with which a closure 22 cooperates. The stem 23 of the closure is attached to the end wall 24 of an inverted cup-shaped expansible-contractible bellows 25, the bottom end of which closes an opening through the top wall of the casing. Surrounding the bellows is a housing 26 to which a thermal bulb 27 is connected by a capillary tube 28, these parts being charged with a thermal fluid, which is indicated by light broken lines to distinguish it from the liquid circulated by the pump through the conduit and the valve casings, and indicated by the heavy broken lines. A compression spring 29 urges the bellows head 24, and therewith stem 23 and closure 22, upward. Between the pump 11 and the conduit is a flow-restricting device 30, the opening through which is of such size that the pressure of the fluid in the conduit is substantially zero when the closures 22 are all in their fully-open positions.

Branching from the conduit, between the restriction 30 and the group of valves, is a pipe 31 which communicates with a fluid-pressure motor, generally indicated at 32 and comprising a cylinder 33 wherein is reciprocable a piston 34 having a stem 35 which is connected at its outer end to means 36 for controlling the operation of a reversible motor 37 having a reciprocable shaft 38 for connection to a device to be operated; the travel of piston 34 being limited to a relatively short distance by stops 39.

The reversible motor 37 may be of the fluid-pressure type, in which case the controlling means 36 consists of valve mechanism which, when operated by movement of the stem 35 in either direction from a neutral position of the piston 34 intermediate stops 39, effects passage of pressure fluid (of a source not shown) to or from the motor 37 so that its shaft 38 is correspondingly moved in opposite directions; the valve mechanism being so arranged that movement of motor shaft 38 is arrested when the piston 34 is in its neutral position, as shown. Alternatively, the motor 37 may be of the electrically-operated type; the controlling means 36 then consisting of switching mechanism for effecting operation of the motor 37 in opposite directions in accordance with the direction of movement of piston 34 from its neutral position—in the same manner as was described in connection with the fluid-pressure type of motor. The arrangement, in either case, is such that when the piston 34 moves in either one direction from its neutral position, the resultant movement of shaft 38 is in an opposite direction.

Connected to the motor shaft 38 is a pivoted arm 40 which carries a rod 41 having a head 42 which bears against one end of a compression spring 43; the other end of the spring bearing against the side of piston 34 opposite to that from which its stem 35 extends. Since, as was mentioned, the movement of shaft 38 (and consequently that of rod 41) is always in a direction opposite to that of piston 34, it will be observed that the force of spring 43 is varied, by the movement of shaft 38, in a sense tending to balance the opposing forces on the piston (produced by the fluid pressure and the spring) so that normally the piston is returned to its neutral position after it has moved in response to variation of the fluid pressure acting thereon.

The operation of the system shown in Fig. 1 will be described, by way of example, in connection with the control of the temperature of an air-cooled aircraft engine; it being assumed that the thermal bulbs 27 are mounted in good heat-conducting relation to selected individual cylinders of the engine, and that the motor shaft is connected by a link 44 to a pivoted flap 45 which controls flow of air to the engine and is movable, in closing movement, to the position in which it is shown in broken lines.

Assuming first that the temperature of all of the thermal bulbs is very low, the valve closures 22 will be in fully-open position due to the fact that the pressure of the thermal fluid on the bellows heads is then insufficient to overcome the upward force of the bias springs 29. The closures 22 being fully open, the only resistance to passage of the liquid delivered by pump 11 is that produced by the restriction 30, so that the fluid pressure in the conduit, and in the branch pipe 31, is substantially zero (as was mentioned hereinabove) and piston 34 is therefore held in engagement with the left-hand pair of stops 39 by the force of spring 43. In that position of the piston, the valve or switch mechanism of the control means 36 is in such condition that the shaft 38 of motor 37 is operated to the limit of its movement in a right-hand direction and flap 44 therefore closed—it being understood that the motor 37, if electrically operated, is of the "stallable" type or that a cut-out limit switch is provided.

If, due to some abnormal condition in one cylinder of the engine, the temperature of the corresponding thermal bulb rises to such a degree that the closure of the corresponding valve is moved into tight engagement with its seat, the fluid pressure in pipe 31 will then become maximum—notwithstanding the fact that the closures of the other valves may still be fully-open. Due to the high pressure of the fluid on piston 34, the same is forced into engagement with the right-hand pair of stops 39 so that the motor 37 is operated to move the flap to its fully-open position; the increased force of spring 43 due to such operation of the motor 37 (and corresponding left-hand movement of rod 41) being insufficient to effect movement of the piston while the one of the closures remains tightly seated and fluid pressure on the piston is therefore maximum.

In normal operation, starting with the engine cold, the temperature of all of the thermal bulbs rises relatively uniformly and the valve closures gradually approach their seats. When the combined pressure-drop across the valve seats becomes appreciable with respect to the pressure-drop across the restriction 30, the fluid pressure in the conduit and pipe 31 rises so that piston 34 is moved in a right-hand direction, against the force of spring 43, first to its neutral position, and then farther to a position wherein the control means 36 is operated to effect movement of motor shaft 38 in a left-hand direction; the resultant increase of the force of spring 43 returning the piston to its neutral position so that movement of shaft 38 is arrested. With continued rise of temperature, and corresponding increase of pressure-drop across the valves, the aforementioned operation is repeated; the piston, at the end of each cycle of operations, returning to its neutral position so that the shaft 38 assumes a series of positions wherein the flap 45 is opened progressively wider until a final position is reached at which the amount of cooling air supplied to the engine is sufficient to maintain it at the desired temperature—for which the thermostatic system, comprising the thermal bulbs and associated valves, is calibrated—the liquid circulating continuously through the valves at a low rate. If the engine temperature then drops below that desired the resultant wider-opening of the valves reduces the fluid pressure acting on piston 34 and the motor is operated in a direction tending to close the flap; the follow-up action, produced by the corresponding reduction of the force of spring 43, periodically checking the operation of the motor.

While, in the foregoing description of the normal operation of the system of Fig. 1 it has been assumed that the change of temperature of the engine had a uniform effect upon all of the thermostatically-controlled valves, in practice such a condition rarely exists. Actually, the temperature of some one of the cylinders is usually sufficiently greater than that of the others that the corresponding valve has a dominant effect upon the pressure of the fluid acting on piston 34; in other words, the system, while functioning generally as described above, is under the "command" of the hottest cylinder. This effect is more readily understood by consideration of the analogy of an electrical circuit including a plurality of resistors in series (corresponding to the series of flow-restrictions provided by the valves)—when one of the resistors has a value considerably higher than that of the others, the effect of the other resistors in the circuit is relatively negligible. The effect is also illustrated in the paragraph before that immediately preceding, wherein the result of abnormal rise of temperature of one of the engine cylinders is described. It is apparent that, in the event of failure of the thermostatic control of one of the valves, as by leakage of the charge of thermostatic fluid so that the valve remains open, the control of the system by the other valves is substantially unaffected.

The thermostatically-controlled valves 17—19 of Fig. 1 are so constructed that the variation of position of the closure with respect to its seat produces a continuous "fluid-pressure follow-up" effect in the system. This is due to the fact that the bellows head 24 is also subjected to the pressure produced by the fluid controlled by the valve, and hence is responsive to the effect which it produces. For example, when the pressure of the thermostatic fluid above the bellows head increases and the closure is thus moved closer to its seat, the resultant increase of pressure of the fluid within the bellows tends to cancel the change; the result being that the pressure of the controlled fluid is always substantially directly proportional to the pressure of the thermostatic fluid—regardless of change of viscosity of the controlled fluid, or of normal change of pressure of the source above a predetermined minimum. It is thus seen that the valves in the system serve as pressure-controlling, rather than flow-controlling, means.

It will further be observed that the fluid-pressure follow-up acts not only on the valve which initiates the change but also, in the same sense, on the valve or valves between it and the pressure source; and, in an opposite sense, on the valve or valves farther from the source—for example, if the closure of valve 18 moves toward its seat, the fluid pressure within the bellows of valves 18 and 17 is increased, while that within the bellows of valve 19 is decreased. This collective effect is not important when the difference of temperature of the thermal bulbs is such that the control of the piston 34 is under the "command" of one of the bulbs; but, in the event that all of the bulbs are approximately at the same temperature (near that desired), the effect of the fluid pressure within the bellows tends to stabilize the controlling action of the valves so that the system is then responsive to the average temperature of the bulbs. However, as was pointed out hereinabove, such a condition is unusual in connection with the operation of engines of the air-cooled aircraft type.

In Fig. 2, a modified form of fluid-pressure control system is shown, which differs from that of Fig. 1 mainly in that the valves are here in parallel relation to each other and their closures are so arranged that they are operated to open position in response to rise of temperature of their associated thermal bulbs 27. The valves, generally indicated at 51, 52 and 53, are of like construction and each comprises a casing 54 having a downwardly-directed valve seat 55 with which a closure 56 cooperates. The stem 57 of the closure is attached to the end wall 58 of an expansible-contractible bellows 59, the open end of which closes an opening through the top wall of the casing. Surrounding the bellows is a housing 60 to which the thermal bulb 27 is connected by means of its capillary tube 28. Covering an opening in the left-hand wall of the housing is a resilient diaphragm 61, and the inlet of the casing (below the valve seat) is extended at 62 to form, with said housing wall, a chamber whereby the outer surface of the diaphragm is continuously subjected to the pressure of the fluid at the inlet.

The inlets of all of the valves 51—53 are connected in common to a conduit 63 into which liquid is forced by the pump 11 through restriction 30; this liquid being indicated by heavy broken lines to distinguish it from the thermostatic fluid within housing 60 which is indicated by light broken lines, as in Fig. 1. The outlets of the valves are similarly connected in common to the return section 64 of the conduit. The system shown in Fig. 2 is intended to be connected, by the branch pipe 31, to pressure-responsive motor-controlling means, such as that shown in the lower portion of Fig. 1.

In considering the operation of the system shown in Fig. 2, it is to be borne in mind that increase of temperature of a thermal bulb tends to effect opening of the closure of its associated valve closure 56, against the bias of spring 65; and hence, if the temperature of one cylinder of the engine (in connection with the control of which the modified system of Fig. 2 likewise will be described) becomes abnormally high, the corresponding valve is opened to its full extent so that the fluid pressure in pipe 31 is then substantially zero—regardless of the condition of the other valves. It is thus apparent that, when the control system of Fig. 2 is employed in connection with the flap-operating mechanism of Fig. 1, the connection to flap 45 must be rearranged so that movement of the motor shaft 38 in a right-hand direction then effects opening of the flap. In other respects, the operation of motor 37 and its controlling means 36, under the control of the system of Fig. 2, is the same as was described above in connection with Fig. 1.

The valves 51—53 serve to throttle the flow of liquid through the conduit 63—64 so that the fluid pressure in pipe 31 is proportional to the effective pressure-drop across the combined valves. As has been mentioned hereinabove in connection with Fig. 1, the temperature of some one of the engine cylinders is usually considerably higher than that of the others and the system of Fig. 2 is also then under the "command" of the valve associated with that cylinder, as will be clear when one considers the electrical analogy of resistors arranged in parallel (corresponding to the pressure-drops across the individual valves)—if the value of one of the resistors is relatively low, the other resistors in parallel with it have little effect upon the flow of current. Similarly, if one of the valves (that associated with the hottest cylinder) is open to a considerably greater extent than the others, the flow of fluid (and corresponding pressure in pipe 31) is dominantly controlled by that valve. If the charge of thermostatic fluid should be lost from one of the valves, the resultant closure of that valve does not materially affect the operation of the system under the control of the other valves.

The valves 51—53 are of the general type disclosed in my copending application, Serial No. 456,008, filed August 25, 1942, now Patent No. 2,401,861, granted June 11, 1946, and a follow-up effect is produced therein due to the arrangement whereby the exterior of the bellows is subjected to the pressure of the fluid controlled by the valves. When the system is in a condition such that variation of the condition of a given one of the valves effects appreciable variation of the pressure of the controlled fluid, such pressure variation tends to restore that valve to its previous condition by displacement of the diaphragm 61 and thereby variation of the volume or capacity of the thermostatic chamber of the valve. The pressure variation is similarly effective upon the diaphragms of the other valves; and, if the valves are all in approximately the same flow-restricting condition, the collective effect due to the follow-up tends to stabilize the operation of the system. However, the most important effect of the follow-up arrangement (in connection with the temperature control of an engine of the character described) is in regard to the individual valves whereby they "recognize" pressure rather than flow, as was mentioned in connection with the valves of Fig. 1.

In connection with the temperature control of a multi-cylinder air-cooled aircraft engine, it is sometimes desirable to add to the control system a thermostatic unit comprising a thermal bulb which is mounted on some part of the engine, the allowable maximum temperature of which is above or below the normal controlling range of that of the cylinders—the valve associated with that bulb being so adjusted that it closes at that temperature. It is apparent from the foregoing description of the operation of the systems of Figs. 1 and 2 that the additional unit will have a dominant effect upon the control of the system when the temperature for which it is adjusted is reached.

While the fluid controlled by the valves is preferably a liquid such as is commonly employed in the hydraulic systems of aircraft, it is obvious that it could be gaseous. Further, the fluid pressure produced by the source or pump could be subatmospheric instead of superatmospheric—the only change then required being in the connection to the flap to reverse its operative movement. To adapt the systems for control of heating apparatus, it is only necessary to interchange the valves of the two systems, i. e., connect the valves of Fig. 2 in series, or the valves of Fig. 1 in parallel—so that the coldest thermostatic unit is then in command.

I claim as my invention:

In a condition control system: a conduit; a source of pressure fluid connected through a restriction to one end of said conduit, the other end of the conduit being at atmospheric pressure; a plurality of throttling valves connected in series in said conduit for controlling flow through the conduit and thereby the pressure of the fluid therein; the flow-restricting means of said valves being so arranged that the pressure of the fluid in each valve is in a sense tending to close the valve; a plurality of fluid-pressure motors for individually operating said valves; a plurality of devices individually cooperable with said motors for operatively varying the pressure therein, said devices being individually and directly responsive to the magnitude of said condition; said motors being so arranged that they are also subjected to the pressure of the fluid within the respective valves and so that, when any one of the valves is operated toward closed position in response to variation of the magnitude of said condition, the variation of fluid pressure in the conduit thereby produced acts upon the motor of that valve in a sense tending to reopen it, and likewise acts in the same sense upon the motor of any of the valves located between said restriction and said one of the valves; each of said valves, said motors, and said condition-responsive devices being substantially alike; an additional fluid-pressure motor connected to said conduit at a point between the restriction and the valves; and means operated by said additional motor for controlling the magnitude of said condition.

LEWIS L. CUNNINGHAM.

REFERENCES CITED

The following references are of record in the file of this patent:

UNITED STATES PATENTS

| Number | Name | Date |
|---|---|---|
| 2,149,792 | Scharpf | Mar. 7, 1939 |
| 2,256,970 | Bryant | Sept. 23, 1941 |
| 2,312,464 | Ziebolz | Mar. 2, 1943 |
| 510,017 | Gassett | Dec. 5, 1893 |
| 554,398 | Powers | Feb. 11, 1896 |
| 2,006,282 | Smith | June 25, 1935 |
| 1,500,260 | Otto | July 8, 1924 |
| 680,423 | Winkenwerder | Aug. 13, 1901 |
| 1,813,401 | Helmstaedter | July 7, 1931 |
| 1,824,057 | Robertshaw | Sept. 22, 1931 |
| 2,200,318 | Yonkers | May 14, 1940 |

FOREIGN PATENTS

| Number | Country | Date |
|---|---|---|
| 750,161 | France | May 22, 1933 |